United States Patent [19]

Humber et al.

[11] 3,892,736

[45] July 1, 1975

[54] PROCESS FOR SELECTIVE BLOCKING OF THE CARBOXYL GROUP ON THE 7-POSITION OF (6R, 7R)-3-ACETOXYMETHYL-7-(4-CARBOXYBUTANAMIDO)CEPH-3-EM-4-CARBOXYLIC ACID

[75] Inventors: David Cedric Humber, Greenford; Anita Lynda Lucrece Lynd, Southall, both of England

[73] Assignee: Glaxo Laboratories Limited, Greenford, England

[22] Filed: June 12, 1972

[21] Appl. No.: 261,598

[30] Foreign Application Priority Data
June 17, 1971 United Kingdom............... 28566/71

[52] U.S. Cl............................ 260/243 C; 424/246
[51] Int. Cl............................................. C07d 99/24
[58] Field of Search ............................. 260/243 C

[56] References Cited
UNITED STATES PATENTS

| | | | |
|---|---|---|---|
| 3,499,909 | 3/1970 | Weissenburger et al. | 260/243 C |
| 3,697,515 | 10/1972 | Fechtig et al. | 260/243 C |
| 3,809,699 | 5/1974 | Ishimaru | 260/239.1 |

Primary Examiner—Nicholas S. Rizzo
Attorney, Agent, or Firm—Bacon & Thomas

[57] ABSTRACT

A process for selectively protecting or blocking the 7-side chain carboxyl group of a 7-(4'-carboxybutanamido)cephalosporin-4-carboxylic acid by reaction with an alcohol (e.g. an alkanol, alkanolamine, a benzyl alcohol or a cycloalkanol) in the presence of an acid catalyst (e.g. an acid halide). The blocked compounds are suitable for subsequent use in the imide halide technique for preparing a 7-amino cephalosporin by N-deacylation.

5 Claims, No Drawings

PROCESS FOR SELECTIVE BLOCKING OF THE CARBOXYL GROUP ON THE 7-POSITION OR (6R, 7R)-3-ACETOXYMETHYL-7-(4-CARBOXYBUTANAMIDO)CEPH-3-EM-4-CARBOXYLIC ACID

This invention relates to a process which may be used in the preparation of 7-aminocephalosporins.

The cephalosporin compounds referred to in this specification are generally named with reference to cepham (see J. Amer. Chem. Soc. 1962, 84, 3400). The term "cephem" refers to the basic cepham structure with one double bond.

Cephalosporin C [(6R,7R)-3-acetoxymethyl-7-(R-5-amino-5-carboxypentanamido)ceph-3-em-4-carboxylic acid] may be N-deacylated to yield the corresponding 7-aminocephalosporin by a variety of processes, with varying degrees of success and convenience; however the N-deacylation has raised many difficulties and there is a need for alternative methods offering advantages. Cephalosporin compounds having a 7-(4'-carboxybutanamido) group may be readily obtained from cephalosporin compounds having the Cephalosporin C 7-side chain by the method of British Pat. Specification No. 1,272,769 and such compounds possess an attractive feature. Whereas cephalosporin compounds having the Cephalosporin C 7-side chain possess both acidic (carboxyl) and basic (amine) functional groups thus making the compounds amphoteric and difficult to isolate and handle, the corresponding compounds with a 7-(4'-carboxybutanamido) group possess only acidic functions.

One method of N-deacylating a 7-acylamido cephalosporin compound is the so-called imide halide technique which involves reacting the 7-acylamido compound with a compound, e.g. phosphorus pentachloride, believed to form an imino halide, converting the product of the reaction into a product believed to be an imino ether by reaction with an alcohol and cleaving the latter e.g. by hydrolysis to yield the desired 7-amino compound. Although the exact nature of the intermediate products is not known they are referred to herein, for convenience, as imide halides and imino ethers.

In order to carry out successfully a method such as the imide halide technique on a cephalosporin compound possessing a 7-(4'-carboxybutanamido) group it is necessary first to protect the carboxyl group at the 4-position and the carboxyl group in the 7-side chain, to avoid undesired reactions. Different considerations apply to the choice of the protecting group for these two carboxyl groups since the group protecting the 4-carboxyl group must be removable at the end of a desired sequence of reactions in order to yield a cephalosporin 4-carboxylic acid whereas the carboxyl group in the 7-side chain does not appear in the cephalosporin product of the imide halide technique. Thus while various considerations apply to the protection of the 4-carboxyl group protection of the carboxyl group in the 7-side chain need only be as cheap and simple as possible.

We have surprisingly found that when a 7-(4'-carboxybutanamido) cephalosporin-4-carboxylic acid is reacted with certain simple alcohols and derivatives thereof selective protection of the 7-side chain carboxyl group occurs. The protected or blocked cephalosporin may then be reacted in a manner so as to protect the 4-carboxyl group and the resulting material may be subjected to the imide halide technique. De-protection, if necessary, of the 4-carboxyl group in the product of the imide halide technique yields a 7-aminocephalosporin 4-carboxylic acid.

According to one embodiment of the invention there is provided a process for the selective protection or blocking of the 7-side chain carboxyl group of a 7-(4'-carboxylbutanamido) cephalosporin-4-carboxylic acid which comprises reacting the cephalosporin compound or a derivative thereof with an alcohol selected from lower alkanols, lower alkanolamines, benzyl alcohols and $C_5$ and $C_6$ cycloalkanols in the presence of an acid catalyst.

Cephalosporin compounds possessing a 7-(4'-carboxybutanamido) group which may be employed in the process according to the invention include compounds of the formula

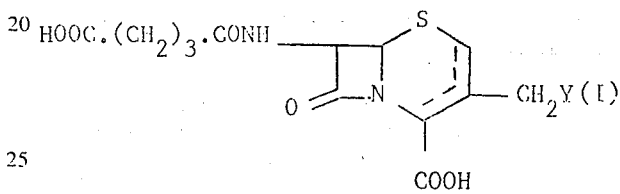

(wherein Y is the residue of a nucleophile e.g. acetoxy and the dotted line bridging the 2-, 3- and 4-positions indicates that the compound may be ceph-2-em or a ceph-3-em compound) or a salt thereof.

The salt, conveniently a mono-salt, may be an alkali metal (e.g. sodium or potassium) salt or an organic ammonium salt, e.g. tri($C_{1-6}$) alkyl ammonium such as triethylammonium; piperidinium; N($C_{1-6}$) alkyl piperidinium; N,N,N-dimethylphenylammonium, pyridinium, quinolinium or benzylammonium.

The alcohol is conveniently a $C_1$–$C_4$ alkanol, such as methanol.

Alternatively the alcohol may be an alkanolamine, e.g. having 2–4 carbon atoms and preferably 2 carbon atoms in the chain between the hydroxyl and amino groups, such as ethanolamine, capable of forming a cyclic amino ether, e.g. a 2-oxazoline, with the 7-side chain carboxy group.

The protected or blocked cephalosporins are novel compounds and form a further feature of the invention. Compounds according to the invention include those having the formula

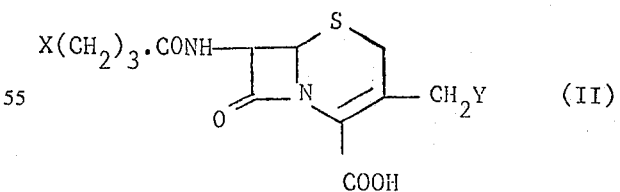

where X is the group ROOC-, and R is the residue of a lower alkanol, a benzyl alcohol or a $C_5$ or $C_6$ cycloalkanol, or X is a group of the formula

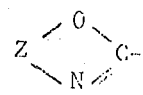

where Z is an alkylene group having 2–4 carbon atoms, and Y has the above defined meaning.

As acid catalyst one may employ an acid alone or an acidic resin e.g. one containing sulphonic acid groups or carboxyl groups. Alternatively however an acid halide may be employed as reagent so that the desired acid is formed in situ. Suitable acid halides thus include acetyl chloride, phosphorus halides such as phosphorus oxychloride, phosgene, thionyl halides, silicon tetrachloride, boron trihalides and nitrosyl chloride. The acid halide may be used in amounts of from 0.01 to 5 mol equivalents based on the cephalosporin, preferably from 0.2 to 1.0 mol equivalent. The preferred acid halide is acetyl chloride.

The selective protection proceeds satisfactorily at from −50° to +70°C and a preferred temperature is from −15° to +30°C. It is preferred that the reaction should be carried out under mild conditions since in this way undesirable side reactions such as lactonisation may be avoided. As solvent for the reaction one may with advantage employ the chosen alcohol or alternatively an inert diluent may be used such as a chlorinated hydrocarbon, an ether or an aromatic hydrocarbon. The course of the reaction may be followed by paper chromatography or electrophoresis.

After the selective protection reaction it is desirable that any free alcohol should be removed before a subsequent reaction such as protection of the 4-carboxyl group is carried out. It may be desirable to separate the protected compound before carrying out a separate reaction and this may be achieved by neutralizing the reaction mixture e.g. with a tertiary base such as N,N-dimethylaniline, pyridine, quinoline or triethylamine before isolation. Alternatively the protected compound may be recovered as a salt e.g. with the cation of an alkali metal.

If it is desired to carry out the imide halide technique on the protected compound obtained by the above process, it will be necessary first to protect the carboxyl group at the 4-position. Methods of protecting such carboxyl groups are known and the preferred methods include formation of readily introducible and removable esters with residues of alcohols such as 2,2,2-trichloroethanol, diphenylmethanol and t-butanol by methods well known in the chemistry of cephalosporins, formation of silyl esters e.g. with mono-and/or dihalogenosilanes and anhydride formation e.g. with a common acid.

The most preferred protecting groups for the 4-carboxyl group are those that do not involve a separate stage at the end of a desired sequence of reactions for their removal.

A convenient method is the formation of a silyl ester with a derivative of a silanol. The derivative of a silanol is conveniently a halosilane or a silazene of the formula $R^1_3SiD$; $R^1_2SiD_2$; $R^1_3Si.NR^1_2$; $R^1_3Si.NH.SiR^1_3$;
$R^1_3Si.NH.COR^1$; $R^1_3Si.NH.CO.NH.SiR^1_3$;
$R^1NH.CO.NR^1.SiR^1_3$; or $R^1C(OSiR^1_3)$: $NSiR^1_3$ where D is a halogen and the various groups $R^1$, which can be the same or different, represent hydrogen atoms or alkyl, e.g. methyl, ethyl, n-propyl, iso-propyl; aryl, e.g. phenyl; or aralkyl, e.g. benzyl, groups. Preferred derivatives of silanols are silyl chlorides such as for example trimethylchlorosilane and dimethyldichlorosilane.

Protection with a silanol derivative may be carried out in an inert organic solvent, such as referred to below, conveniently at or below ambient temperatures, e.g. 10°C. An acid binding agent, such as pyridine, is desirably present when a halosilane is used.

An advantageous method of protecting the carboxyl group at the 4-position is to react the cephalosporin compound with a phosphorus trihalide, especially phosphorus trichloride or phosphorus tribromide. Protection may be carried out in an inert organic solvent such as a halogenated hydrocarbon, a cyclic or acyclic ether or an aromatic hydrocarbon. The reaction of the cephalosporin compound with the phosphorus trihalide may be effected at a temperature of −50°C to +65°C under substantially anhydrous conditions. This method of protection is described in greater detail in the co-pending Application Ser. No. 241,087 of Philip Howard Chapman et al. filed Apr. 4, 1972.

Examples of other compounds which may be used to protect the 4-carboxyl group as an anhydride are halides of alkanoic acids having up to 7 carbon atoms and halogenated derivatives thereof, e.g. acetyl, propionyl, chloroacetyl, dichloroacetyl and trichloroacetyl chlorides and halides of aryl carboxylic acids such as benzoic acid and analogous acids substituted e.g. with nitro and/or methoxy groups.

Alternatively, an anhydride may be formed with an oxalic acid halide of the formula XOC.COY, where X is a halogen atom and Y is a lower alkoxy group. The halogen atom may be chlorine or bromine, preferably chlorine. The lower alkoxy group may have 1 to 4 carbon atoms, e.g. methoxy or ethoxy. Examples of suitable oxalic acid halides are ethyloxalyl and methyloxalyl chloride.

Anhydride formation may generally be carried out at a temperature of −100°C to +40°C, conveniently at room temperature, in an inert solvent such as referred to above with reference to the phosphorus trihalide reaction. Anhydrous conditions are preferred.

The protection of the 4-carboxyl group is usually carried out in the presence of a base, which may be derived at least in part from a cephalosporin salt or may be added separately with a cephalosporin free acid. The base is preferably used in excess, and is suitably an organic tertiary base such as pyridine, quinoline, N,N-dimethylaniline, N,N-diethylaniline or triethylamine.

Bases required for the imide halide- and imino ether-forming steps may conveniently be added in full amount at this stage, and thus up to 6 mole equivalents of the base may be used.

According to a further feature of the invention we provide a process for the preparation of a 7-aminocephalosporin-4-carboxylic acid which comprises (i) protecting or blocking the 4-carboxyl group of a 7-(4′-carboxybutanamido)cephalosporin-4-carboxylic acid which has its 4′-carboxyl group protected or blocked in accordance with the invention; and (ii) contacting the resultant product with an imide halide-forming compound, and (iii) commingling the resultant reaction mixture with an imino ether-forming compound, i.e. an alcohol e.g. a lower alkanol, and then, if desired, with water, and recovering the 7-aminocephalosporin formed e.g. by adjusting the pH approximately to the isoelectric point by treatment with a base. If desired the end product may be recovered as an acid addition salt, e.g. the salt with p-toluene sulphonic acid.

The invention will now be described in more detail with reference to the imide-halide technique.

IMIDE HALIDE-FORMING COMPOUND

Imide halide-forming compounds which may be used include inorganic acid halides which function as a halogenating agent e.g. halides (particularly chlorides or bromides) of phosphorus acids or of sulphur acids for example, phosphorus pentachloride, thionyl chloride and phosgene. Phosphorus pentachloride is particularly preferred, and when used it is conveniently added in finely divided form, e.g. 10 mesh.

A. REACTION OF THE IMIDE HALIDE-FORMING COMPOUND WITH THE CEPHALOSPORIN COMPOUND

This reaction may be carried out in the presence of a base, preferably an organic base. Suitable organic bases, which preferably have a pKa of 4 to 6, include tertiary amines such as, for example, pyridine, N,N'-dimethylaniline, quinoline or N,N'-dimethylacetamide while calcium carbonate may be used as an inorganic base. If excess base is used in the preceding reaction, it will not normally be necessary to use further base in this reaction.

A mixture of the imide halide-forming compound and the base may, if desired, be contacted with the cephalosporin compound. The reaction is preferably carried out in an inert organic solvent such as a chlorinated hydrocarbon, e.g. methylene chloride, 1,2-dichloroethane or chloroform or an ether.

The imide halide-forming compound may be added to the cephalosporin compound in molar excess and amounts of up to 10 mole excess may be used. It is uneconomical to use a large excess and we prefer to work with the cephalosporin compound and the imide halideforming compound in molar proportions of from 1:1 to 1:3, particularly in the case of phosphorus pentachloride.

The temperature for the reaction of the imide halide-forming compound with the cephalosporin compound may be above −100°, e.g. −50° to +100°C. The optimum temperature will depend, to some extent at least, on the reactants employed. It may be advantageous to operate at temperatures of −30° to +30°C and we prefer to operate at from −30° to +10°C.

IMINO ETHER-FORMING COMPOUND

The imino ether-forming compound is an alcohol such as an alkanol having from 1 to 6 carbon atoms for example methanol, ethanol or n-propanol or a diol of the formula $$HO - R^2 - OH$$

(where $R^2$ is a divalent alkylene or cycloalkylene group having 2, 3 or 4 carbon atoms in the carbon chain linking the two oxygen atoms). Suitable diols include ethylene glycol, propane-1,2- and -1,3-diol, butane -1,2-; -1,3-; -1,4- and -2,3-diol, pentane diols such as pentane -2,4-diol and hexane diols fulfilling the condition of having 2, 3 or 4 carbon atoms in the carbon chain linking the two oxygen atoms. The preferred imino ether-forming compound is methanol. A preferred diol is butane-1,3-diol.

B. REACTION WITH THE IMINO ETHER-FORMING COMPOUND

The product of step (A) is reacted with the imino ether-forming compound, the course of the reaction being followed, e.g. by thin layer or paper chromatography or polarimetry.

The imino ether-forming compound may be used in substantial molar excess e.g. up to 75, and preferably even 100 moles over the cephalosporin compound.

The temperature for the reaction with the imino ether-forming compound may be above −100°, e.g. −50° to +20°C. The optimum temperature will depend, to some extent at least, on the reactants employed and in general we prefer to carry this step out at temperatures of from −50° to −10°C.

Although the imino ether-forming compound may be added to the reaction solution, we prefer to add the reaction solution to the imino ether-forming compound. This allows better reaction control on a large scale.

The reaction may be carried out in the presence of an organic base, which may conveniently be carried through from the previous reaction. The reaction may also be carried out in the presence of a substantially anhydrous acid in an amount, for example, of about 1 mole based on the cephalosporin. Suitable acids include hydrogen chloride, concentrated sulphuric acid and p-toluene sulphonic acid.

C. AQUEOUS TREATMENT

On completion of step (B) the reaction mixture is preferably contacted with water or an aqueous medium, if desired an aqueous solution of an acid which forms an insoluble acid addition salt with the amino compound. The aqueous treatment step is not essential as the desired amino compound may also be produced by alcoholysis, e.g. by methanol.

The reaction with water may be effected at a temperature of −25° to +50°C, preferably −5° to +20°C.

Under the acidic conditions prevailing in both steps (B) and (C) and when the group protecting the 4-carboxyl group forms a silyl ester or an anhydride) the hydrolysis or alcoholysis of the protecting group and imino ether are driven to completion and the 7-amino cephalosporin-4carboxylic acid is formed. The amino compound may be readily recovered by altering the pH to its isolectric point i.e. about 3.5 (where Y = $CH_3CO.O$). This may be achieved by titration with aqueous ammonia.

In cases where the group protecting the 4-carboxyl group is not acid labile, a separate deprotection step is of course necessary.

The 7-amino compound may be isolated as an acid addition salt, e.g. the hydronitrate or a hydrocarbyl sulphonate such as a p-toluenesulphonate or methanesulphonate.

The following Examples illustrate the invention. Temperatures are in °C.

Unless stated otherwise the following experimental procedures were adopted.

Melting-points were determined on a Kofler hotstage and are uncorrected. Optical rotations were determined at 19° to 23°. Ultraviolet spectra were determined in 0.1M-sodium phosphate buffer adjusted to pH 6.0 with phosphoric acid. Infrared spectra were recorded as nujol mulls. Nuclear magnetic resonance spectra were determined at 100 MHz in dimethylsulphoxide-$d_6$; the signs of coupling constants are not assigned.

Reaction extracts were dried over anhydrous magnesium sulphate prior to removal of the solvent by rotary evaporation at or below 30°. Solids were dried over phosphorus pentoxide at 19° to 30°/1 mm. Benzene was dried by storage over sodium wire. Chloroform was dried by distillation from phosphorus pentoxide.

Paper chromatography was carried out on Whatman No. 1 paper buffered at pH5, at room-temperature (19° to 30°), with downwards elution with n-propanol-water (7:3). $R_x$ values represent movement with respect to (6R,7R)-3-acetoxymethyl-7-(4-carboxybutanamido)ceph-3-em-4-carboxylic acid, $R_x$ 1.00.

Paper electrophoresis was performed on Whatman No. 3.MM paper at 25 volts/cm. in 0.02M-disodium hydrogen phosphate buffer adjusted to pH 7.0 with phosphoric acid; $R_z$ values represent migration to the anode with respect to (6R,7R)-3-acetoxymethyl-7-(4-carboxybutanamido)ceph-3-em-4-carboxylic acid; dextran blue served as neutral marker.

EXAMPLE 1

(6R,7R)-3-Acetoxymethyl-7-(4-carbomethoxybutanamido)ceph-3-em-4-carboxylic acid.

a. A solution of (6R,7R)-3-acetoxymethyl-7-(4-carboxybutanamido)ceph-3-em-4-carboxylic acid (3.86 g, 10 mmole) in methanol (25 ml.) was diluted with methylene chloride (200 ml.), and cooled to ca. 0° to 5°. Acetyl chloride (0.14 ml; ca. 2 mmole) was added to methanol (25 ml) and similarly cooled. The two solutions were mixed at 0° to 5° and kept at this temperature for 4 days, and then evaporated in vacuo below 20°. The residual white foam was partitioned between chloroform (100 ml) and M-aqueous sodium hydrogen carbonate (50 ml). The organic layer was extracted with further sodium hydrogen carbonate (50 ml). The combined aqueous portions were back-extracted with chloroform (20 ml), then taken to pH 1.0 with 2N-hydrochloric acid whilst in the presence of a layer of ethyl acetate (50 ml). The aqueous portion was extracted with additional ethyl acetate (50 ml), and the combined extracts were washed with saturated brine (50 ml), dried, and evaporated to give a white solid (3.01g.). Treatment with ether-acetone (9:1; 20 ml) provided the title monomethyl ester (2.89g; 72.2%), m.p. 132° to 133.5°, $[\alpha]_D$ + 100° (c 1.04; MeOH), $\lambda_{max}$. 260 nm ($\epsilon$ 9,130), $\nu_{max}$. 3250 (NH), 2700 and 1680 ($CO_2H$), 1764 (azetidin-2-one), 1740 and 1214 ($OCO.CH_3$), 1718 ($CO_2CH_3$), 1698 and 1523 cm$^{-1}$. (CONH), $\tau$ 1.15 (1-proton doublet, J 8 Hz; —N$\underline{H}$), 4.32 (1-proton double doublet, J 4.5 and 8 Hz; $C_7$—$\underline{H}$), 4.91 (1-proton doublet, J 4.5 Hz; $C_6$—$\underline{H}$), 4.97 and 5.29 (2-proton AB-quartet, J 13 Hz; —C$\underline{H}_2$OCOC$H_3$), 6.32 and 6.55 (2-proton AB-quartet, J 17 Hz; —SC$\underline{H}_2$), 6.40 (3-proton singlet; —$CO_2C\underline{H}_3$), ca. 7.5 to 7.8 (4-proton multiplet; —C$\underline{H}_2$C$H_2$C$\underline{H}_2$—), 7.97 (3-proton singlet; —COC$\underline{H}_3$) and ca. 8.0 to 8.4 (2-proton multiplet; —C$H_2$C$\underline{H}_2$C$H_2$—) (Found: C, 47.8; H, 5.1; N, 6.8; S, 7.9. $C_{16}H_{20}N_2O_8S$ (400.4) requires, C, 48.0; H, 5.0; N, 7.0; S, 8.0%). $R_x$ 2.23, $R_z$ 0.66, white spots on pink background upon spraying with potassium iodoplatinate. (b) Dowex 50W-X8 ion exchange resin (H$^+$form) (20 ml; washed by decantation with methanol) was added to a solution of (6R, 7R)-3-acetoxymethyl-7-(4-carboxy-butanamido)ceph-3-em-4-carboxylic acid (386 mg; 1 mmole) in methanol (60 ml.). The mixture was stirred at ca. 20° for 6 hr. and the progress of the reaction followed by paper chromatography, which showed gradual conversion of the starting diacid, $R_x$ 1.00, to a new component with identical $R_x$ value to the title monomethyl ester, $R_x$ 2.23.

EXAMPLE 2

(6R, 7R)-3-Acetoxymethyl-7-aminoceph-3-em-4-carboxylic acid (7-ACA).

a. Triethylamine (1.4 ml, 10 mmole) and then pyridine (0.81 ml, 10 mmole) were added to a stirred suspension of (6R, 7R)-3-acetoxymethyl-7-(4-carbomethoxybutanamido) ceph-3-em-4-carboxylic acid (4.00g; 10 mmole) in dry methylene chloride (334 ml) under dry nitrogen. To the resulting solution was added chlorotrimethylsilane (2.16 ml, 17 mmole); the mixture was stirred at ca. 20° for 2 hr, cooled to −20°, and pyridine (10.0 ml, 124 mmole), followed by phosphorus pentachloride (6.55 g, 31.45 mmole) suspended in methylene chloride (65 ml), were added. The mixture was stirred at −13° for 40 min., during which time it gradually darkened; it was then cooled to −20°. Methanol (192 ml) was added and the golden solution stirred at −10° for 30 min, then at ca. 21° for 1 hr. 50 %-Aqueous formic acid (17 ml) was added and the pH adjusted from 0.7 to 2.0 with triethylamine. The mixture was stirred at ca. 21° for 45 min., then taken to pH 3.5. The resulting suspension was refrigerated overnight, and the title amino-acid collected (1.21 g.), $\lambda_{max}$. 264 nm ($E_{1cm}^{1\%}$ 289), with identical mobility on paper chromatography and electrophoresis to an authentic sample, $R_x$ 1.55 $R_z$ 0.84, which showed yellow upon spraying with a 0.5% (w/v) solution of ninhydrin in ethanol. Assuming a $\lambda_{max}$. 264 nm ($E_{1cm}^{1\%}$ 300) for the pure title compound, corrected yield = 42.8%.

b. Pyridine (2.01 ml, 25 mmole) was added to a stirred solution of (6R, 7R)-3-acetoxymethyl-7-(4-carbomethoxybutanamido)ceph-3-em-4-carboxylic acid (2.00g, 5 mmole) in dry methylene chloride (50 ml) under nitrogen. The solution was cooled to 10°, dichlorodimethylsilane (1.025ml, 8.5 mmole) was added, and the mixture was stirred at ca. 21° for 20 min., then cooled to −17°. Phosphorus pentachloride (2.25 g, 10.8 mmole) was added and the mixture was stirred at −15° for 2 hr, during which time it gradually darkened. The mixture was added dropwise to methanol (25 ml) at such a rate that the temperature of the stirred solution did not exceed 10°. The solution was stirred for 20 min. at 10°, then water (11 ml) was added, and the pH of the mixture was taken from 0.6 to 3.5 with 0.880 -ammonia solution. After refrigeration for 1 hr, the gelatinous precipitate was collected, washed successively with water (5 ml), methanol (5 ml), and methylene chloride (10 ml), and dried to give the title amino-acid (1.22 g), $\lambda_{max}$. 262. nm ($E_{1cm}^{1\%}$ 257). Corrected yield, 76.8%.

c. The procedure of Example 2b was repeated with the exception that the methanolysis was conducted at −20°C, not letting the temperature rise above −10°. The yield was 1.17 g., $\lambda_{max}$. 264 nm ($E_{1cm}^{1\%}$ 287). Corrected yield, 82.2%.

d. The procedure of Example 2b was repeated with N,N-dimethylaniline (3.175 ml, 25 mmole) in place of the pyridine. The yield was 0.73g, $\lambda_{max}$. 263.5 nm ($E_{1cm}^{1\%}$ 284). Corrected Yield, 50.8%.

e. The procedure of Example 2b was repeated with quinoline (2.95 ml, 25 mmole) in place of the pyridine. The yield was 1.14g, $\lambda_{max}$. 264 nm ($E_{1cm}^{1\%}$ 287). Corrected yield, 80.4%.

f. The procedure of Example 2b was repeated with 1,2-dichloroethane (50 ml) in place of methylene chloride. The yield was 1.03 g., $\lambda_{max}$. 263.5 nm. ($E_{1cm}^{1\%}$ 294). Corrected yield, 74.3%.

g. The procedure of Example 2f was repeated with quinoline (2.95 ml, 25 mmole) in place of pyridine. The yield was 0.62g., $\lambda_{max}$. 264 nm. ($E_{1cm}^{1\%}$ 270). Corrected yield, 41.0%.

h. The procedure of Example 2b was repeated with butane-1,3-diol (25 ml) in place of methanol. The yield was 1.27g. (highly gelatinous), $\lambda_{max}$. 263 nm ($E_{1cm}^{1\%}$ 209). Corrected yield, 64.8%.

i. The procedure of Example 2b was repeated but with the following modified work-up. The presumed iminochloride was added to methanol (50 ml) at $-20°$ at such a rate that the temperature did not rise above $-10°$. The solution was warmed to $+10°$, and stirred for 10 min., the pH was adjusted to 3.5 with concentrated ammonia. After refrigeration for 1 hr, the dense white precipitate was collected, washed with water (15 ml), methanol (5 ml), and methylene chloride (10 ml), and dried. The yield was 1.49g., $\lambda_{max}$. 264 nm ($E_{1cm}^{1\%}$ 267). Corrected yield, 97.5%.

j. To a stirred suspension of (6p, 7R)-3-acetoxymethyl-7-(4-carbometh oxy butanamido)ceph-3-em-4-carboxylic acid (2.00g, 5 mmole) in dry chloroform (38 ml) under nitrogen were added successively quinoline (2.0 ml, 17 mmole), acetyl chloride (0.8 ml, 11 mmole), and N,N-dimethylformamide (4 drops). The resulting solution was stirred at ca. 20° for 1 hour, then cooled to $-15°$; quinoline (0.70 ml, 6 mmole) and then phosphorus pentachloride (2.4g, 11.6 mmole) were added. The mixture was stirred at $-15°$ for 2 hr and treated with methanol (12 ml), resulting in a temperature rise to $+5°$. The solution was cooled to $-15°$, stirred for 30 min., and water (20 ml) was added. The mixture was allowed to warm to $+20°$ over 30 min.; the layers were separated and the organic portion was extracted with additional water (2 × 10 ml). The combined aqueous portions were washed with chloroform, and the pH adjusted from 0.8 to 3.5 with 0.880-ammonia solution. The resulting precipitate was collected after brief refrigeration (30 min), and washed with water (5 ml), methanol (5 ml), and methylene chloride (10 ml) to give the title amino-acid (892 mg), $\lambda$max. 264 nm ($E_{1cm}^{1\%}$ 291). Corrected yield, 63.5%.

k. A solution of (6R, 7R)-3-acetoxymethyl-7-(4-carboxybutanamido)ceph-3-em 4-carboxylic acid (3.86g, 10 mmole) in methanol (25 ml) and methylene chloride (200 ml), at 0° to 5°, was treated with a similarly cold solution of acetyl chloride (0.14 ml, 2 mmole) in methanol (25 ml). After 54 hr. at 0° to 5°; the solution was evaporated to an off-white foam which was re-dissolved in methylene chloride (100 ml); pyridine (4.02 ml, 50 mmole) was added. The solution was cooled to 10°, dichlorodimethylsilane (2.05 ml, 17 mmole) was added, and the solution stirred at ca. 20° for 20 min., then cooled to $-17°$. Phosphorus pentachloride (2.7g. mmole) was added and the mixture stirred at $-15°$ for 2 hr. then treated with additional pyridine (1.13 ml, 14 mmole). The mixture was added to methanol (50 ml) at 0° at such a rate that the temperature did not exceed $+10°$. The solution was stirred at this temperature for 20 min, water (22 ml) was added, and the pH adjusted from 1.0 to 3.5 with 0.880-ammonia solution. After refrigeration for 2 hr. the precipitate was collected, washed with water (10 ml), methanol (10 ml), and methylene chloride (20 ml), and then dried to give the title amino-acid (2.02g), $\lambda_{max}$. 264 nm ($E_{1cm}^{1\%}$ 287). Corrected yield, 71.0%.

l. A solution of (6R, 7R)-3-acetoxymethyl-7-(4-carboxybutanamido)ceph-3-em-4-carboxylic acid (1.93g, 5 mmole) in methanol (21 ml) and methlene chloride (16 ml), at 0° to 5°, was treated with a similarly cold solution of acetyl chloride (0.35 ml, 5 mmole) in methanol (5 ml) and methylene chloride (10 ml). After 2 hr. at 0° to 5°, pyridine (0.40 ml, 5 mmole) was added and the solution evaporated to give a white foam which was redissolved in methylene chloride (50 ml) and treated as described in Example 2b, to give the title amino-acid (873.5 mg), $\lambda_{max}$. 263 nm ($E_{1cm}^{1\%}$ 276). Corrected yield, 59.1%.

EXAMPLE 3

Reaction of (6R, 7R)-3-acetoxymethyl-7-(4-carboxybutanamido) ceph-3-em-4-carboxylic acid with various alcohols in the presence of acetyl chloride.

a. (6R, 7R)-3-Acetoxymethyl-7-(4-carboxybutanamido)ceph-3-em-4-carboxylic acid (386 mg, 1 mmole) was dissolved in benzyl alcohol-methylene chloride (1:1; 24 ml) and cooled to 0° to 5°. Acetyl chloride (0.014 ml, 0.2 mmole) was added and the solution was stirred at ca. 22° for 88 hours, the progress of the reaction being followed by paper chromatography. Slow conversion of the diacid, $R_x$ 1.00, to a more mobile component was observed, $R_x$ 2.84, showing white with potassium iodoplatinate, and consistent with its being (6R, 7R)-3-acetoxymethyl-7-(4-carbobenzyloxybutanamido)ceph-3-em-4-carboxylic acid.

b. (6R, 7R)-3-Acetoxymethyl-7-(4-carboxybutanamido)ceph-3-em-4-carboxylic acid (386 mg, 1 mmole) dissolved in tetrahydrofuran (5.25 ml)-ethanol (4.25 ml) was treated with a cold solution of acetyl chloride (0.07 ml, 1 mmole) in ethanol (1.0 ml) and kept at 0° to 5° for 24 hours. Pater chromatography showed slow conversion of the diacid, $R_x$ 1.00, to a new component, $R_x$ 2.38 (white with iodoplatinate) and consistent with its being (6R, 7R)-3-acetoxymethyl-7-(4-carboethoxybutanamido)ceph-3-em-4-carboxylic acid.

c. The procedure of Example 3b was repeated with n-propanol in place of ethanol, providing as in Example 3(b) a new component consistent with there being present (6R, 7R)-3-acetoxymethyl-7-(4-carbo-n-propoxybutanamido)ceph-3-em-4-carboxylic acid $R_x$ 2.54 (white with iodoplatinate).

d. The procedure of Example 3b was repeated with isopropanol in place of ethanol. Some conversion to a new component occurred, $R_x$ 2.54 (white with iodoplatinate) consistent with its being (6R, 7R)-3-acetoxymethyl-7-(4-carbo-iso-propoxybutanamido)ceph-3-em-4-carboxylic acid.

We claim:

1. In a process for the selective blocking of the 7-side chain carboxyl group of (6R, 7R)-3-acetoxymethyl-7-(4-carboxybutanamido)ceph-3-em-4-carboxylic acid, the step of reacting said carboxylic acid or a salt thereof selected from the group consisting of an alkali metal, tri($C_1$–$C_6$) alkyl ammonium, piperidinium, N($C_1$–$C_6$) alkyl piperidinium, N,N,N-dimethylphenylammonium, pyridinium, quinolinium and benzylammonium salt with an alcohol selected from the group consisting of a $C_1$–$C_4$ alkanol, an alkanolamine having 2–4 carbon atoms in the chain between the hydroxyl and amino groups, benzyl alcohol, cyclopentanol and cyclohexanol in the presence of an acid halide catalyst to selectively esterify said 7-side chain carboxyl group without esterifying the 4-carboxyl group.

2. A process as claimed in claim 1 wherein the acid catalyst is acetyl chloride.

3. A process as claimed in claim 1 wherein the acid catalyst is an acid halide used in an amount of 0.2 to 1.0 mol equivalent, based on the cephalosporin compound, and the reaction temperature is −15° to +30°C.

4. A compound selected from the group consisting of a compound of the formula

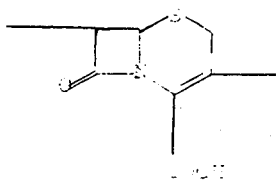

where X is ROOC— in which R is selected from the group consisting of $C_1$–$C_4$ alkyl, benzyl, cyclopentyl, and cyclohexyl or

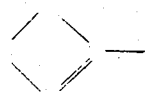

where Z is an alkylene group having 2–4 carbon atoms, and a salt thereof selected from the group consisting of an alkali metal, tri ($C_1$–$C_6$) alkylammonium, piperidinium, N($C_1$–$C_6$) alkyl piperidinium, N,N,N-dimethylphenylammonium, pyridinium, quinolinium and benzylammonium salt.

5. A compound as defined in claim 4 which is (6R, 7R)-3-acetoxymethyl-7-(4-carbomethoxybutanamido)ceph-3-em-4-carboxylic acid.

* * * * *